US012650095B2

(12) United States Patent
Tachibana et al.

(10) Patent No.: US 12,650,095 B2

(45) Date of Patent: Jun. 9, 2026

(54) FUEL SUPPLY DEVICE FOR INTERNAL COMBUSTION ENGINE

(71) Applicant: TOYOTA JIDOSHA KABUSHIKI KAISHA, Toyota (JP)

(72) Inventors: Mina Tachibana, Toyota (JP); Yuki Suzuki, Kariya (JP); Tomihisa Tsuchiya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 5 days.

(21) Appl. No.: 19/048,997

(22) Filed: Feb. 10, 2025

(65) Prior Publication Data

US 2025/0290463 A1 Sep. 18, 2025

(30) Foreign Application Priority Data

Mar. 15, 2024 (JP) ................................ 2024-041262

(51) Int. Cl.
*F02D 41/38* (2006.01)
*F02D 41/00* (2006.01)
*F02M 21/02* (2006.01)

(52) U.S. Cl.
CPC ..... *F02D 41/3836* (2013.01); *F02D 41/0027* (2013.01); *F02M 21/0239* (2013.01); *F02M 21/0242* (2013.01); *F02D 2200/0602* (2013.01); *F02M 21/0206* (2013.01)

(58) Field of Classification Search
CPC ............ F02D 41/3836; F02D 41/0027; F02D 2200/0602; F02D 2250/31; F02M 21/0239; F02M 21/0242; F02M 21/0206; F02M 21/0245; Y02T 10/30
See application file for complete search history.

(56) References Cited

U.S. PATENT DOCUMENTS 6,405,710 B1 * 6/2002 Brehob .............. F02M 63/0225 123/456
10,316,787 B2 * 6/2019 Aso ......................... F02D 41/32
2007/0089710 A1 * 4/2007 Watanabe ........... F02D 41/3836 123/446
2013/0014729 A1 * 1/2013 Saito ................... F02D 19/0605 123/458
2016/0319784 A1 * 11/2016 Yamada ................ F02M 37/10
(Continued)

FOREIGN PATENT DOCUMENTS

JP 2022-182969 A 12/2022

*Primary Examiner* — Sizo B Vilakazi

(57) ABSTRACT

A fuel supply device for an internal combustion engine includes a tank, a fuel injection valve, a fuel passage, a second shut-off valve to open and close the fuel passage, a variable volume mechanism configured to vary the volume of a downstream-side fuel passage, which is a section of the fuel passage that is connected to a downstream side of the electromagnetic valve, and a controller that executes a fuel pressure control. In the fuel pressure control, the second shut-off valve is repeatedly opened and closed such that the fuel pressure in the downstream-side fuel passage falls within a range defined by an upper limit value and a lower limit value. The controller executes a volume increasing process that operates the variable volume mechanism to increase the volume of the downstream-side fuel passage during the execution of the fuel pressure control.

5 Claims, 6 Drawing Sheets

(56) References Cited

U.S. PATENT DOCUMENTS

| | | | | |
|---|---|---|---|---|
| 2019/0093591 | A1* | 3/2019 | Imai | F02D 41/3854 |
| 2025/0198355 | A1* | 6/2025 | Suzuki | F02D 19/024 |
| 2025/0215836 | A1* | 7/2025 | Suzuki | F02M 21/0206 |
| 2025/0369405 | A1* | 12/2025 | Hattori | F02D 41/221 |

* cited by examiner

FUEL SUPPLY DEVICE FOR INTERNAL COMBUSTION ENGINE

CROSS-REFERENCE TO RELATED APPLICATIONS

This application is based upon and claims the benefit of priority from Japanese Patent Application No. 2024-041262, filed on Mar. 15, 2024, the entire contents of which are incorporated herein by reference.

BACKGROUND

1. Field

The present disclosure relates to a fuel supply device for an internal combustion engine.

2. Description of Related Art

For example, an internal combustion engine disclosed in Japanese Laid-Open Patent Publication No. 2022-182969 reduces the pressure of gas fuel stored in a tank before supplying the gas fuel to fuel injection valves.

As a method of fuel pressure control such as the one described above, the following control can be implemented.

Specifically, an electromagnetic valve is provided in a fuel passage that connects a tank for storing fuel to a fuel injection valve that supplies fuel to a cylinder. The electromagnetic valve opens and closes the fuel passage. An allowable upper limit value and an allowable lower limit value are set for the target of the fuel pressure. When fuel injection from the fuel injection valve is performed in a state in which the electromagnetic valve is closed, fuel flows out from the fuel passage downstream of the electromagnetic valve. As a result, the fuel pressure downstream of the electromagnetic valve decreases. When the downstream fuel pressure reaches the lower limit value, the electromagnetic valve is driven to open. This allows fuel to be supplied to the fuel passage downstream of the electromagnetic valve. Consequently, the fuel pressure downstream of the electromagnetic valve increases. When the downstream fuel pressure reaches the upper limit value, the electromagnetic valve is driven to close. By repeatedly driving the electromagnetic valve to open and close in this manner, the pressure of the fuel downstream of the electromagnetic valve, which is the pressure of the fuel supplied to the fuel injection valve, is adjusted to a fuel pressure within a range defined by the upper limit value and the lower limit value.

When performing fuel pressure control that involves repeated opening and closing of the electromagnetic valve, wear may progress in sliding parts of the electromagnetic valve or similar components due to the repeated opening and closing operations during the execution of fuel pressure control.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a fuel supply device for an internal combustion engine includes a tank that stores fuel, a fuel injection valve that supplies fuel to a cylinder, a fuel passage that supplies the fuel in the tank to the fuel injection valve, an electromagnetic valve that is provided in the fuel passage so as to open and close the fuel passage, a variable volume mechanism, and a processing circuitry. The variable volume mechanism is configured to vary a volume of a downstream-side fuel passage. The downstream-side fuel passage is a section of the fuel passage that is connected to a downstream side of the electromagnetic valve in a flow direction of the fuel in the fuel passage. The processing circuitry executes a fuel pressure control. In the fuel pressure control, the electromagnetic valve is repeatedly opened and closed such that a fuel pressure in the downstream-side fuel passage falls within a range defined by an upper limit value and a lower limit value. The processing circuitry is configured to execute a volume increasing process that operates the variable volume mechanism to increase a volume of the downstream-side fuel passage during the execution of the fuel pressure control.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, “at least one of A and B” should be understood to mean “only A, only B, or both A and B.”

Hereinafter, an embodiment of a fuel supply device for an internal combustion engine will be described with reference to FIGS. 1 to 4.

Internal Combustion Engine, Fuel Supply Device, and Controller

Figure 1:
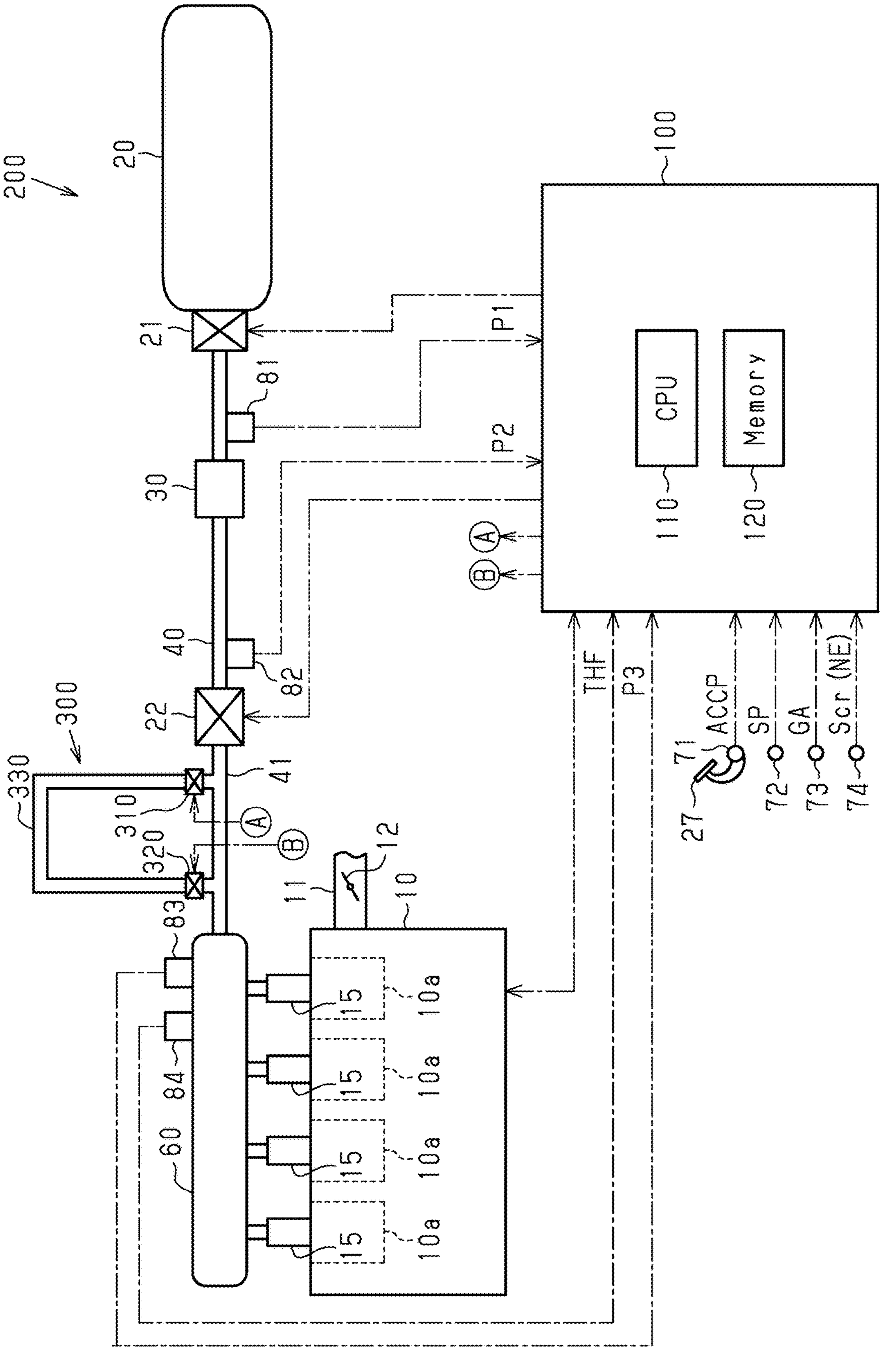
FIG. 1 is a schematic diagram of an internal combustion engine, fuel supply system, and a controller according to an embodiment.

An internal combustion engine 10 shown in FIG. 1 is mounted on a vehicle, and uses hydrogen gas, which is gas fuel, as fuel.

A throttle valve 12 that adjusts an intake air amount is provided in an intake passage 11 of the internal combustion engine 10.

A fuel supply device 200 included in the internal combustion engine 10 includes fuel injection valves 15, a tank 20, a fuel pipe 40, a first shut-off valve 21, a second shut-off valve 22, a pressure reducing valve 30, a delivery pipe 60, and a variable volume mechanism 300.

The fuel injection valves 15 supply fuel to cylinders 10*a* of the engine 10.

The tank 20 stores hydrogen gas, which is gas fuel, in a high-pressure compressed state.

The fuel pipe 40 connects the tank 20 and the delivery pipe 60.

The fuel injection valves 15 are connected to the delivery pipe 60. The fuel pipe 40 and the delivery pipe 60 are a fuel passage connecting the tank 20 and the fuel injection valves 15. The hydrogen gas stored in the tank 20 is supplied to the fuel injection valves 15 via the fuel pipe 40 and the delivery pipe 60.

In the fuel pipe 40, the first shut-off valve 21, the pressure reducing valve 30, and the second shut-off valve 22 are arranged in this order in the flow direction of the fuel.

The first shut-off valve 21 is an electromagnetic valve, and is disposed near the outlet of the tank 20. When the first shut-off valve 21 is open, fuel is supplied from the tank 20 to the fuel pipe 40. When the first shut-off valve 21 is closed, the supply of fuel from the tank 20 to the fuel pipe 40 is stopped.

The pressure reducing valve 30 decompresses the high-pressure hydrogen-containing gas stored in the tank 20 to a predetermined level (for example, about 4 MPa), and supplies the decompressed hydrogen-containing gas to the fuel injection valves 15.

The second shut-off valve 22 is an electromagnetic valve that opens and closes the fuel passage, and is disposed near the delivery pipe 60 in the fuel passage. When the second shut-off valve 22 is opened by energization, fuel is supplied to the delivery pipe 60. When the second shut-off valve 22 is closed due to the de-energization, the supply of fuel to the delivery pipe 60 is stopped.

The first shut-off valve 21 and the second shut-off valve 22 are closed while the operation of the internal combustion engine 10 is stopped. On the other hand, the first shut-off valve 21 and the second shut-off valve 22 are basically open during operation of the internal combustion engine 10.

The first pressure sensor 81 is provided in the fuel pipe 40 between the first shut-off valve 21 and the pressure reducing valve 30. The first pressure sensor 81 detects a first pressure P1 which is a fuel pressure in the fuel pipe 40 between the first shut-off valve 21 and the pressure reducing valve 30.

The second pressure sensor 82 provided in the fuel pipe 40 between the pressure reducing valve 30 and the second shut-off valve 22 detects a second pressure P2 that is the fuel pressure in the fuel pipe 40 between the pressure reducing valve 30 and the second shut-off valve 22.

A third pressure sensor 83 provided in the delivery pipe 60 detects a third pressure P3, which is a fuel pressure in the delivery pipe 60. A temperature sensor 84 provided in the delivery pipe 60 detects a fuel temperature THF which is the temperature of the fuel in the delivery pipe 60.

A section of the fuel passage that is connected to the downstream side of the second shut-off valve 22 in the flow direction of the fuel in the fuel passage is referred to as a downstream-side fuel passage. The fuel supply system of the internal combustion engine 10 is provided with a variable volume mechanism 300 for varying the volume of the downstream-side fuel passage. The downstream-side fuel passage of the present embodiment includes a downstream-side fuel pipe 41, which is a fuel pipe connecting the second shut-off valve 22 and the delivery pipe 60, and the delivery pipe 60.

The variable volume mechanism 300 includes a pipe 330, a first electromagnetic valve 310 provided in the pipe 330, and a second electromagnetic valve 320 provided in the pipe 330.

The pipe 330 has opposite ends connected to the downstream-side fuel pipe 41. Therefore, the pipe 330 is connected in parallel to the downstream-side fuel pipe 41. A volume V of an internal space of the pipe 330 defined by an inner diameter and a pipe length of the pipe 330 is set to an appropriate value in consideration of a valve closing time Tcl described later.

The first electromagnetic valve 310 and the second electromagnetic valve 320 are operation valves that regulate a flow connection state between the downstream-side fuel pipe 41 and the pipe 330. The first electromagnetic valve 310 is provided in the vicinity of one of both ends of the pipe 330. The second electromagnetic valve 320 is provided in the vicinity of the other of the two ends of the pipe 330.

The controller 100 performs various controls such as fuel injection of the internal combustion engine 10 by controlling various control targets such as the throttle valve 12, the fuel injection valves 15, the first shut-off valve 21, the second shut-off valve 22, the first electromagnetic valve 310, and the second electromagnetic valve 320. The controller 100 includes a CPU 110 and a memory 120 constituted by a ROM, a RAM, and the like. The CPU 110 executes a program stored in the memory 120 to perform various controls.

The controller 100 refers to various values necessary for controlling the internal combustion engine 10. For example, the controller 100 refers to detection values of the first pressure sensor 81, the second pressure sensor 82, the third pressure sensor 83, and the temperature sensor 84. Further, the controller 100 refers to a detection signal of an accelerator position sensor 71 that detects an accelerator operation amount ACCP that is an operation amount of an accelerator pedal 27 operated by a driver of the vehicle on which the internal combustion engine 10 is mounted. In addition, the controller 100 refers to a detection signal of a speed sensor 72 that detects a vehicle speed SP of a vehicle on which the internal combustion engine 10 is mounted. Further, the controller 100 refers to a detection signal of an air flow meter 73 that detects an intake air amount GA of the internal combustion engine 10, and a detection signal Scr of a crank angle sensor 74 that detects a rotation angle of a crankshaft of the internal combustion engine 10.

The controller 100 calculates the engine speed NE based on the detection signal Scr of the crank angle sensor 74. Further, the controller 100 calculates an engine load factor KL based on the engine speed NE and the intake air amount GA. The engine load factor KL represents the ratio of the current cylinder inflow air amount to the cylinder inflow air amount at the time of steady operation of the internal combustion engine 10 in a full load state at the current engine speed NE. The cylinder inflow air amount is the amount of air that flows into each cylinder in the intake stroke.

Hydrogen gas, which is an engine fuel, has a wider range of a combustible air-fuel mixture than gasoline, and can be combusted even in a lean air-fuel mixture. Therefore, the controller 100 adjusts the output of the internal combustion engine 10 through the following combustion control.

That is, the controller 100 calculates a required output Pe, which is a required value of the engine output of the internal combustion engine 10, based on the accelerator operation amount ACCP and the like. The controller 100 sets the required injection amount Qd based on the required output Pe. The required injection amount Qd is a target value of the fuel injected from one fuel injection valve 15 in one combustion cycle. Based on the target air-fuel ratio AFt and the required injection amount Qd, the controller 100 calculates a required air amount GAd that is a target value of the intake air amount required for obtaining the target air-fuel ratio AFt. The target air-fuel ratio AFt of the present embodiment is a lean air-fuel ratio such as an air excess ratio $\lambda$=2.5 to 3.0, for example. Then, the controller 100 controls the fuel injection valves 15 such that an amount of fuel corresponding to the required injection amount Qd is injected. Further, the controller 100 controls the opening degree of the throttle valve 12 so that an amount of air corresponding to the required air amount GAd is introduced into the cylinder. In this way, in the internal combustion engine 10, the output adjustment is performed by changing the air-fuel ratio of the air-fuel mixture through the adjustment of the fuel injection amount and the intake air amount.

Fuel Pressure Control

The controller 100 executes fuel pressure control. In the fuel pressure control, the opening/closing drive of the second shut-off valve 22 is repeated so that the fuel pressure in the downstream-side fuel passage, which is equal to the pressure of the fuel supplied to the fuel injection valves 15, becomes a pressure within the control range CR defined by the upper limit value PtU and the lower limit value PtL. The target fuel pressure Pt in the fuel pressure control is lower than the second fuel pressure P2, which is the fuel pressure reduced by the pressure reducing valve 30, and is set in advance. For example, the target pressure Pt is about 1 MPa. An upper limit value of the fuel pressure allowable with respect to the target pressure Pt is set to an upper limit value PtU. Further, a lower limit value of the fuel pressure allowable with respect to the target pressure Pt is set to a lower limit value PtL.

Figure 2:
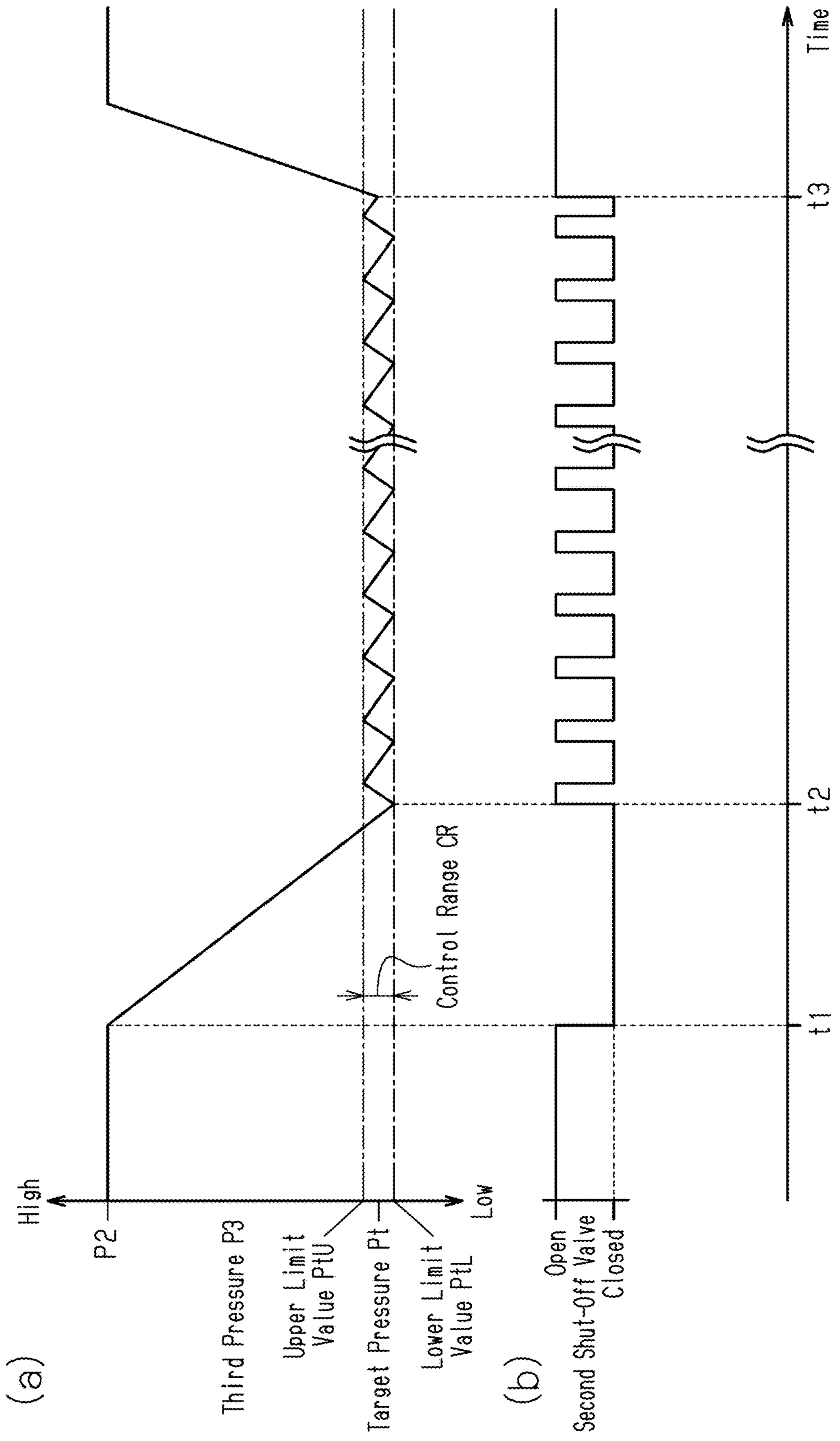
FIG. 2 is a timing diagram showing a fuel pressure control, where part (a) shows changes in a fuel pressure, and part (b) shows an operating state of a second shut-off valve.

FIG. 2 shows an example of fuel pressure control. Part (a) of FIG. 2 shows changes in the third pressure P3, and part (b) of FIG. 2 shows the operating states of the second shut-off valve 22.

Before time t1, the hybrid vehicle is traveling normally, and the second shut-off valve 22 are maintained in the open state. The third pressure P3 is equal to the second pressure P2, which has been reduced by the pressure reducing valve 30.

At time t1, when the engine 10 is required to be operated at idle, the second shut-off valve 22 are closed and the closed state is maintained. While the second shut-off valve 22 is closed, the amount of fuel in the delivery pipe 60 decreases each time fuel is injected from the fuel injection valves 15. Therefore, the third pressure P3 gradually decreases.

At time t2, when the third pressure P3 reaches the lower limit value PtL, the second shut-off valve 22 is opened. Thus, the fuel is supplied to the fuel passage downstream of the second shut-off valve 22. Therefore, the fuel pressure downstream of the second shut-off valve 22 increases. The second shut-off valve 22 are closed when the third pressure P3 reaches the upper limit value PtU. By repeatedly opening and closing the second shut-off valve 22 in this way, the pressure of the fuel downstream of the second shut-off valve 22 and supplied to the fuel injection valves 15 is adjusted to a pressure within the control range CR defined by the upper limit value PtU and the lower limit value PtL.

As described above, when the required injection amount Qd decreases, for example, during idling, the fuel injection control is performed to maintain the third pressure P3 at a low level, so that a small amount of fuel is injected from the fuel injection valve 15 with high accuracy.

When the execution request of the fuel pressure control is not present at the time t3, the second shut-off valve 22 are maintained in the open state. While the second shut-off valve 22 is open, fuel is supplied from the tank 20 to the delivery pipe 60. Therefore, the third pressure P3 gradually increases toward the second pressure P2.

Volume Increasing Process

When the fuel pressure control in which the opening and closing drive of the second shut-off valve 22 is repeated is executed, there is a possibility that wear progresses in a sliding portion or the like of the second shut-off valve 22 along with the opening and closing operation during the execution of the fuel pressure control. Further, the electromagnetic coil of the second shut-off valve 22 may generate heat due to the opening and closing operation during the fuel pressure control. Therefore, during the execution of the fuel pressure control, the controller 100 executes a volume increasing process of operating the variable volume mechanism 300 so as to increase the volume of the downstream-side fuel passage.

Figure 3:
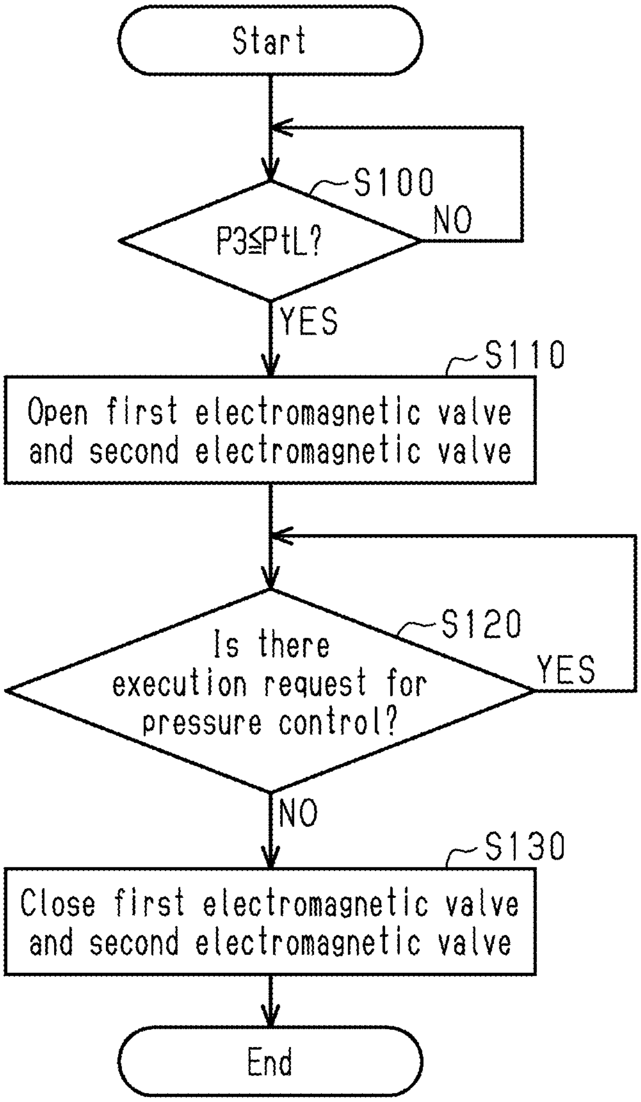
FIG. 3 is a flowchart showing a procedure of processes executed by the controller.

FIG. 3 shows a procedure of the volume increasing process executed by the controller 100. The processing shown in FIG. 3 is implemented by the CPU 110 executing a program stored in the memory 120 of the controller 100. The process shown in FIG. 3 is started when the execution of the fuel pressure control is requested. The execution request of the fuel pressure control is requested, for example, when the operation state of the internal combustion engine 10 is shifted to an idle operation state. In the following description, the number of each step is represented by the letter S followed by a numeral.

When this process is started, the controller 100 determines whether the third pressure P3 is equal to or less than the lower limit value PtL (S100). Then, the controller 100 repeatedly executes the processing of S100 until it is determined that the third pressure P3 is equal to or less than the lower limit value PtL.

When it is determined that the third pressure P3 is equal to or less than the lower limit value PtL (S100: YES), the controller 100 opens both the first electromagnetic valve 310 and the second electromagnetic valve 320 (S110). When both the first electromagnetic valve 310 and the second electromagnetic valve 320 are opened, the downstream-side fuel pipe 41 and the pipe 330 are in a flow connection state. Therefore, the volume of the downstream-side fuel passage is increased.

Next, the controller 100 determines whether there is an execution request for fuel pressure control at present (S120). Then, the controller 100 repeatedly executes the S120 process until it is determined that there is no execution request.

When it is determined that there is no execution request of the fuel pressure control, the controller 100 closes both the first electromagnetic valve 310 and the second electromagnetic valve 320 (S130). When both the first electromagnetic valve 310 and the second electromagnetic valve 320 are closed, the downstream-side fuel pipe 41 and the pipe 330 are brought into a disconnected state. Therefore, the volume of the downstream-side fuel passage returns to the volume before the increase. The controller 100 determines that there is no execution request for the fuel pressure control, for example, when the operation state of the internal combustion engine 10 shifts to a state in which the engine load is higher than in the idle operation state.

When the S130 process is executed, the controller 100 ends the present process.

Operation of the Present Embodiment

Figure 4:
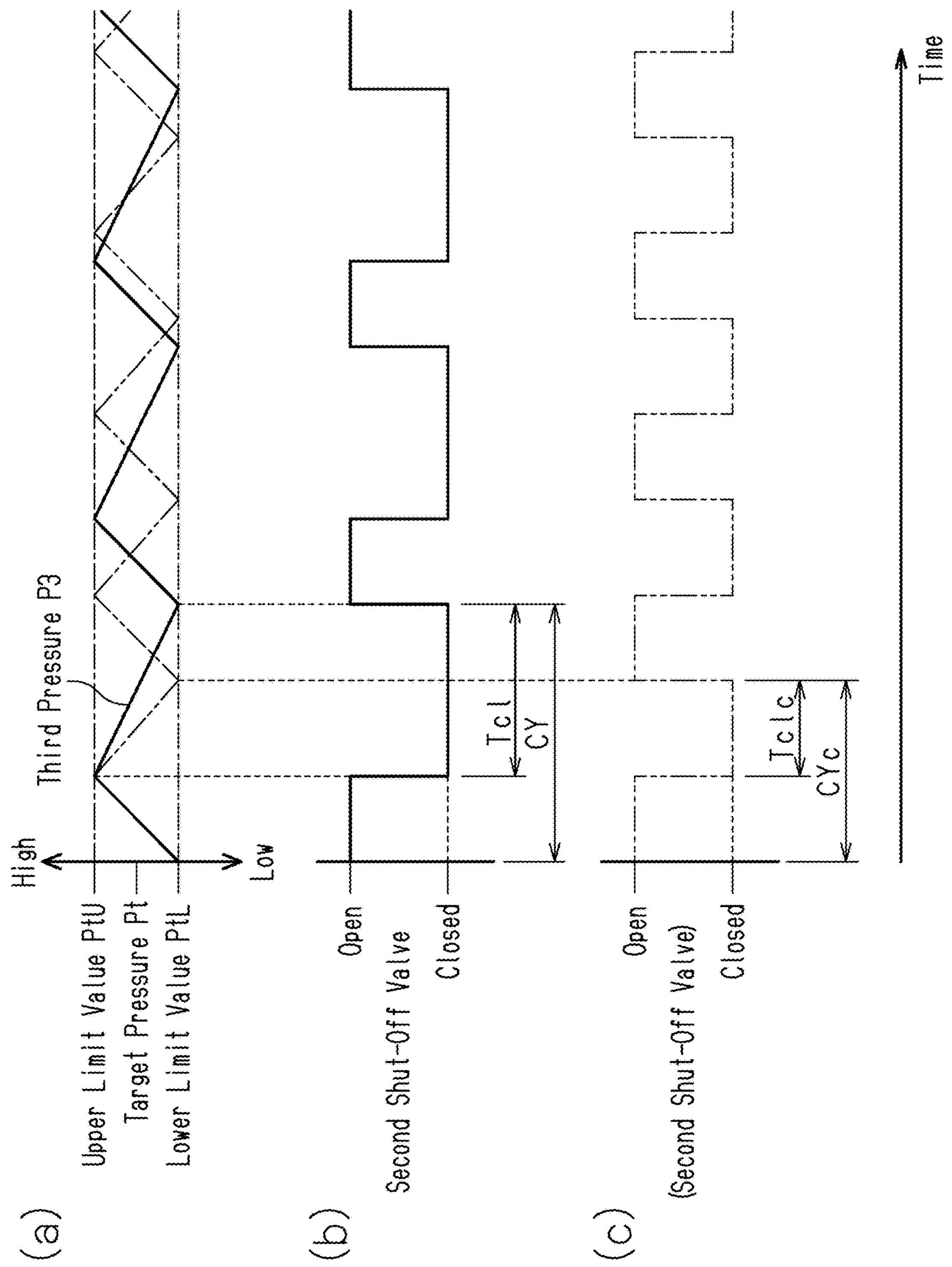
FIG. 4 is a diagram showing operation of a volume increasing process, where part (a) shows changes in a third pressure, part (b) shows an operating state of the second shut-off valve according to the present embodiment, and part (c) shows an operating state of the second shut-off valve in a case in which no variable volume mechanism is employed.

FIG. 4 shows operation of the volume increasing process. Part (a) of FIG. 4 shows changes in the third pressure P3 during the fuel pressure control. The solid line in part (a) indicates changes in the third pressure P3 in the present embodiment. The long-dash double-short-dash line in part (a) shows a comparative example with respect to the present embodiment, and indicates changes in the third pressure P3 in a case in which the variable volume mechanism 300 is not provided. Part (b) of FIG. 4 shows an operation state of the second shut-off valve 22 in the present embodiment. Part (c) of FIG. 4 is a comparative example with respect to the present embodiment, and shows an operation state of the second shut-off valve 22 in a case in which the variable volume mechanism 300 is not provided.

During execution of the fuel pressure control, the downstream-side fuel pipe 41 and the pipe 330 are in a flow connection state. This increases the volume of the downstream-side fuel passage. Therefore, in the present embodiment, the rate of decrease in the third pressure P3 during the execution of the fuel pressure control is slower than that in the comparative example. When the rate of decrease in the third pressure P3 slows down, the time required for the third pressure P3 to reach the lower limit value PtL becomes longer. Therefore, the valve-closing time Tcl of the second shut-off valve 22 becomes longer than the valve-closing time Tclc in the comparative example. If the valve closing time Tcl of the second shut-off valve 22 becomes longer, the opening and closing cycle CY of the second shut-off valve 22 becomes longer than the opening and closing cycle CYc in the comparative example, so that the number of times of opening and closing of the second shut-off valve 22 during the execution of the fuel pressure control decreases.

Advantages of the Present Embodiment (1) The controller 100 executes the volume increasing process that operates the variable volume mechanism 300 to increase the volume of the downstream-side fuel passage during the execution of the fuel pressure control. This increases the volume of the downstream-side fuel passage during the execution of the fuel pressure control. The increase in the volume of the downstream-side fuel passage reduces the number of times of opening and closing of the second shut-off valve 22 during the execution of the fuel pressure control decreases, as described above. Accordingly, the wear of the second shut-off valve 22 due to the opening and closing operation is suppressed. Further, since the number of times of opening and closing of the second shut-off valve 22 is reduced, heat generation of the second shut-off valve 22 is also suppressed.

(2) The variable volume mechanism 300 includes the pipe 330 having opposite ends connected to the downstream-side fuel pipe 41, and the first electromagnetic valve 310 and the second electromagnetic valve 320, which regulates the flow connection state between the downstream-side fuel pipe 41 and the pipe 330. As the volume increasing process, the controller 100 executes a process that opens both the first electromagnetic valve 310 and the second electromagnetic valve 320 to establish a flow connection state between the downstream-side fuel pipe 41 and the pipe 330. Accordingly, during the execution of the fuel pressure control, the volume of the downstream-side fuel passage increases by the volume V of the internal space of the pipe 330. Therefore, the volume of the downstream-side fuel passage is increased during the execution of the fuel pressure control.

(3) The fuel used in the internal combustion engine 10 is a gas fuel. Unlike liquid fuels such as gasoline, gas fuels have poor lubricity. Therefore, in the second shut-off valve 22, which repeatedly opens and closes, wear due to sliding is likely to progress. In this regard, the present embodiment reduces the number of times of opening and closing of the second shut-off valve 22 during the execution of the fuel pressure control, as described above. This configuration therefore suppresses the wear of the second shut-off valve 22 disposed in the fuel system of the internal combustion engine 10, which uses the gas fuel.

Modifications

The above-described embodiment may be modified as follows. The above-described embodiment and the following modifications can be combined as long as the combined modifications remain technically consistent with each other.

Figure 5:
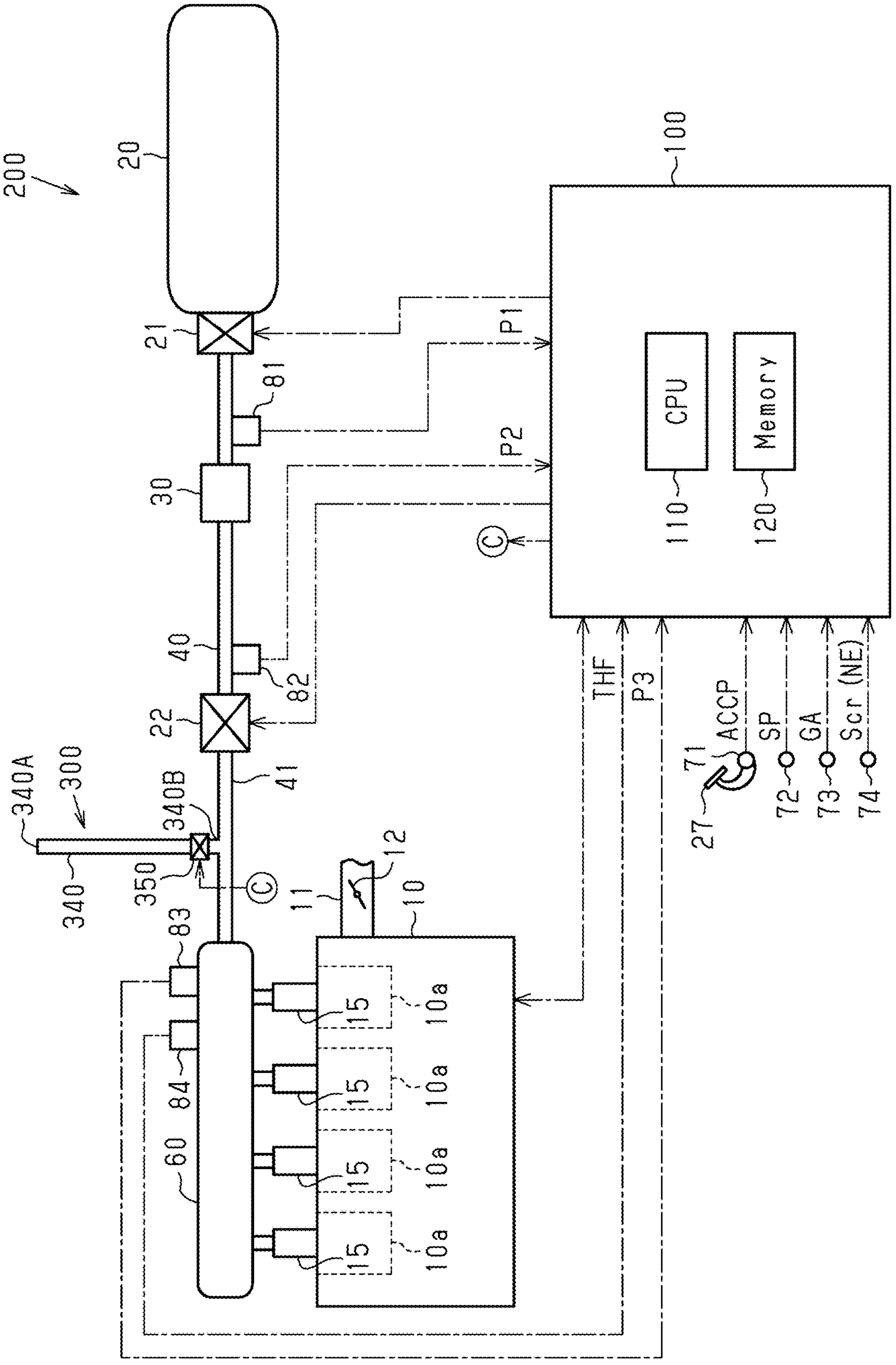
FIG. 5 is a schematic diagram showing a variable volume mechanism according to a modification.

As shown in FIG. 5, the variable volume mechanism 300 may include a pipe 340 having a closed first end 340A and a second end 340B connected to the downstream-side fuel pipe 41, and an electromagnetic valve 350 which is an operation valve for regulating a flow connection state between the downstream-side fuel pipe 41 and the pipe 340. The electromagnetic valve 350 is preferably provided in the vicinity of the second end 340B of the pipe 340. Then, the controller 100 may execute, as the volume increasing process, a process of opening the electromagnetic valve 350 to establish a flow connection state between the downstream-side fuel pipe 41 and the pipe 340. In this case as well, during execution of the fuel pressure control, the volume of the downstream-side fuel passage increases by the volume of the internal space of the pipe 340. Therefore, in this modification as well, the volume of the downstream-side fuel passage can be increased during execution of the fuel pressure control.

Figure 6:
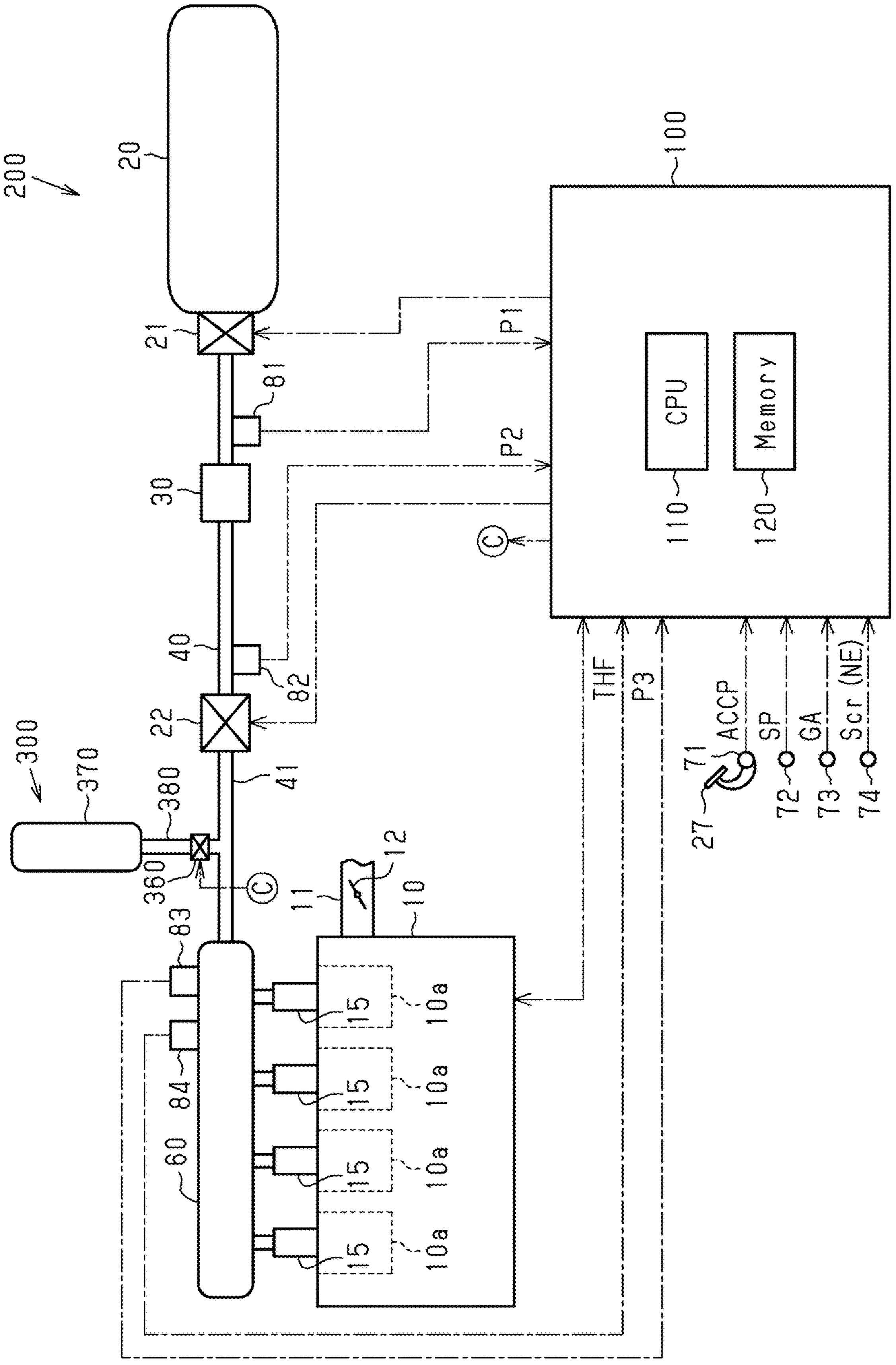
FIG. 6 is a schematic diagram showing a variable volume mechanism according to a modification.

As shown in FIG. 6, the variable volume mechanism 300 may include a pressure accumulator 370 connected to the downstream-side fuel pipe 41, and an electromagnetic valve 360 that is an operation valve for regulating a flow connection state between the downstream-side fuel pipe 41 and the pressure accumulator 370. The downstream-side fuel pipe 41 and the pressure accumulator 370 may be connected to each other via a pipe 380. The electromagnetic valve 360 may be provided in the pipe 380. Further, although not shown, the pressure accumulator 370 may be directly connected to the downstream-side fuel pipe 41, and the electromagnetic valve 360 may be provided at a connection portion between the pressure accumulator 370 and the downstream-side fuel pipe 41. Then, the controller 100 may execute a process of opening the electromagnetic valve 360 to establish a flow connection state between the downstream-side fuel pipe 41 and the pressure accumulator 370 as the volume increasing process. Even in this case, during the execution of the fuel pressure control, the volume of the downstream-side fuel passage increases by at least the volume of the internal space of the pressure accumulator 370. Therefore, in this modification as well, the volume of the downstream-side fuel passage can be increased during execution of the fuel pressure control.

The variable volume mechanism 300 may be provided in the delivery pipe 60.

The fuel used in the internal combustion engine 10 is hydrogen gas, which is a gas fuel, but may be another gas fuel such as compressed natural gas.

The fuel used in the internal combustion engine 10 is a gas fuel, but may be a liquid fuel.

The controller 100 is not limited to a device that includes a CPU and a memory and executes software processing. For example, the controller 100 may include a dedicated hardware circuit, such as an application specific integrated circuit (ASIC), that performs hardware processing on at least a part of the software processing in the above-described embodiment. That is, the controller 100 may be modified as long as it includes processing circuitry that has any one of the following configurations (a) to (c). (a) Processing circuitry including at least one processor that executes all of the above-described processes according to programs and at least one program storage device such as a ROM that stores the programs. (b) Processing circuitry including at least one processor and at least one program storage device that execute part of the above-described processes according to the programs and at least one dedicated hardware circuit that executes the remaining processes. (c) Processing circuitry including at least dedicated hardware circuit that executes all of the above-described processes. The program storage device, which is a computer-readable medium, includes any type of medium that is accessible by a general-purpose computer or a dedicated computer.

What is claimed is:

1. A fuel supply device for an internal combustion engine, the device comprising:
- a tank that stores fuel;
- a fuel injection valve that supplies fuel to a cylinder;
- a fuel passage that supplies the fuel in the tank to the fuel injection valve;
- an electromagnetic valve that is provided in the fuel passage so as to open and close the fuel passage;
- a variable volume mechanism configured to vary a volume of a downstream-side fuel passage, the downstream-side fuel passage being a section of the fuel passage that is connected to a downstream side of the electromagnetic valve in a flow direction of the fuel in the fuel passage; and
- a processing circuitry that executes a fuel pressure control, wherein
- in the fuel pressure control, the electromagnetic valve is repeatedly opened and closed such that a fuel pressure in the downstream-side fuel passage falls within a range defined by an upper limit value and a lower limit value, and
- the processing circuitry is configured to execute a volume increasing process that operates the variable volume mechanism to increase a volume of the downstream-side fuel passage during the execution of the fuel pressure control.

2. The fuel supply device for the internal combustion engine according to claim 1, wherein
- the variable volume mechanism includes:
  - a pipe having opposite ends connected to the downstream-side fuel passage; and
  - an operation valve that regulates a flow connection state between the downstream-side fuel passage and the pipe, and
- the volume increasing process opens the operation valve to establish a flow connection state between the downstream-side fuel passage and the pipe.

3. The fuel supply device for the internal combustion engine according to claim 1, wherein
- the variable volume mechanism includes:
  - a pipe having a closed first end and a second end connected to the downstream-side fuel passage; and
  - an operation valve that regulates a flow connection state between the downstream-side fuel passage and the pipe, and
- the volume increasing process opens the operation valve to establish a flow connection state between the downstream-side fuel passage and the pipe.

4. The fuel supply device for the internal combustion engine according to claim 1, wherein
- the variable volume mechanism includes:
  - a pressure accumulator connected to the downstream-side fuel passage; and
  - an operation valve that regulates a flow connection state between the downstream-side fuel passage and the pressure accumulator, and
- the volume increasing process opens the operation valve to establish a flow connection state between the downstream-side fuel passage and the pressure accumulator.

5. The fuel supply device for the internal combustion engine according to claim 1, wherein the fuel used in the internal combustion engine is a gas fuel.

* * * * *